S. P. SMITH & C. W. KEIVER.
CARBURETER.
APPLICATION FILED SEPT. 30, 1912.

1,064,102.

Patented June 10, 1913.
2 SHEETS—SHEET 1.

Witnesses.
E. S. Lemme.
S. Constine.

Inventors.
Stephen P. Smith
and Charles W. Keiver
by Wm. F. Booth
their Attorney.

S. P. SMITH & C. W. KEIVER.
CARBURETER.
APPLICATION FILED SEPT. 30, 1912.

1,064,102.

Patented June 10, 1913.

2 SHEETS—SHEET 2.

Witnesses.
E. S. Lemmer
S. Constine

Inventors.
Stephen P. Smith
and Charles W. Keiver
by Wm. F. Booth
their Attorney.

UNITED STATES PATENT OFFICE.

STEPHEN P. SMITH, OF BERKELEY, AND CHARLES W. KEIVER, OF OAKLAND, CALIFORNIA.

CARBURETER.

1,064,102.  Specification of Letters Patent.  Patented June 10, 1913.

Application filed September 30, 1912. Serial No. 723,084.

*To all whom it may concern:*

Be it known that we, STEPHEN P. SMITH and CHARLES W. KEIVER, citizens of the United States, the said SMITH residing at Berkeley, in the county of Alameda and State of California, and the said KEIVER residing at Oakland, in the county of Alameda, State of California, have invented certain new and useful Improvements in Carbureters, of which the following is a specification.

Our invention relates to that class of carbureters, intended for use in connection with lighting plants, in which air is supplied from a suitable source, to a body of liquid hydrocarbon in a container, and brought in such relation thereto as to be carbureted in its course to the light-burners.

The object of our invention is to provide a simple and effective carbureter of this class which is specially adapted for receiving and carbureting air in varied volume and pressures according to the number and needs of the lights, and to this end our invention consists in the novel carbureter which we shall hereinafter fully describe by reference to the accompanying drawings in which—

Figure 1:
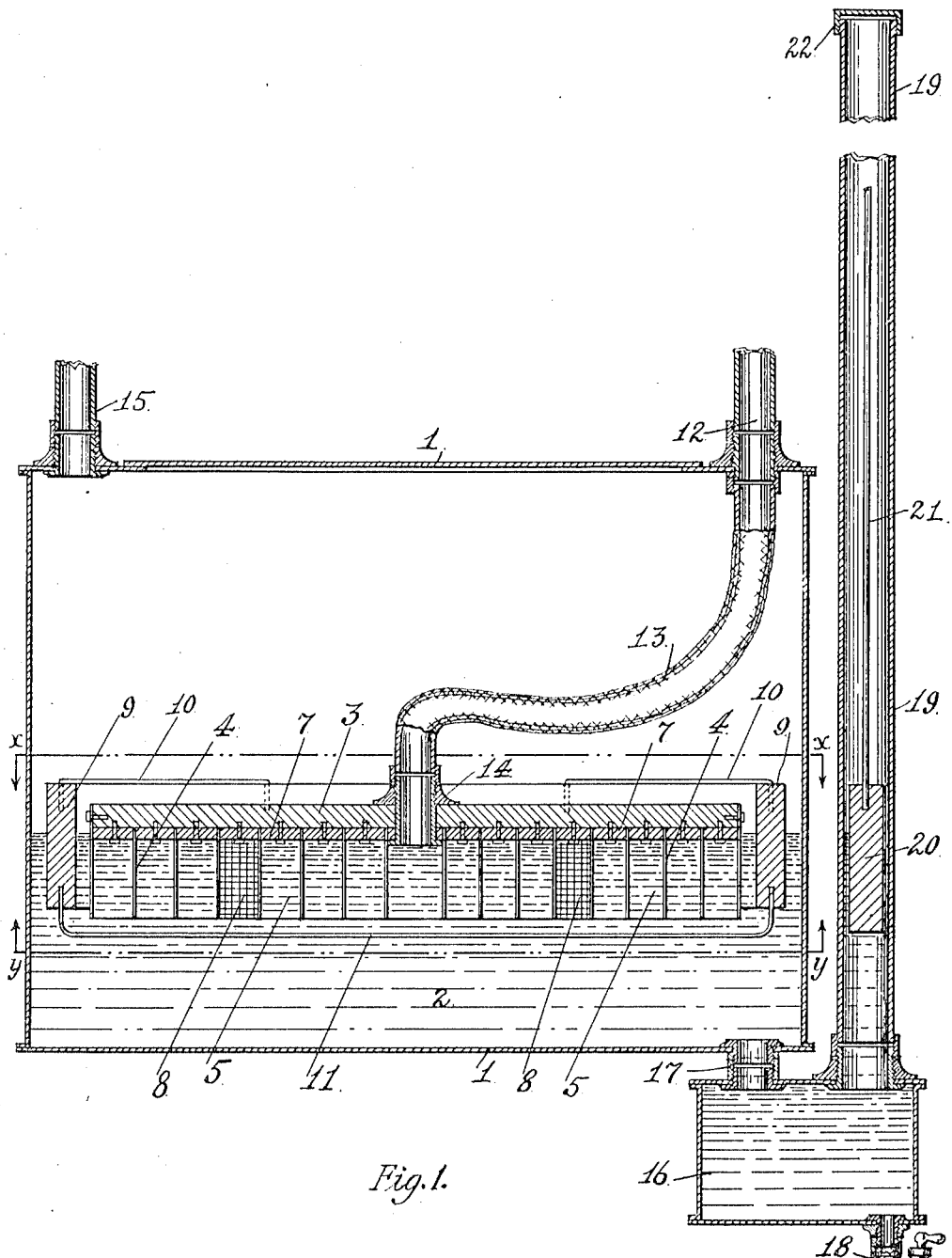
Figure 2:
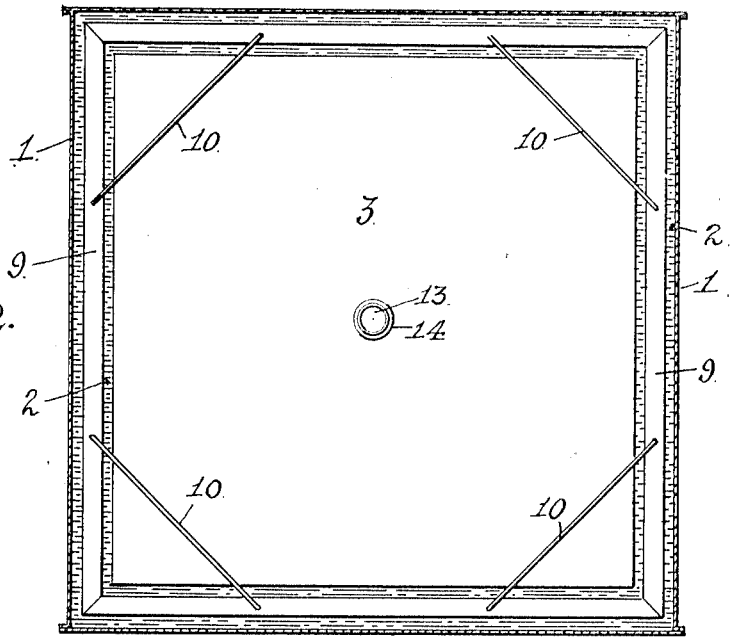
Figure 3:
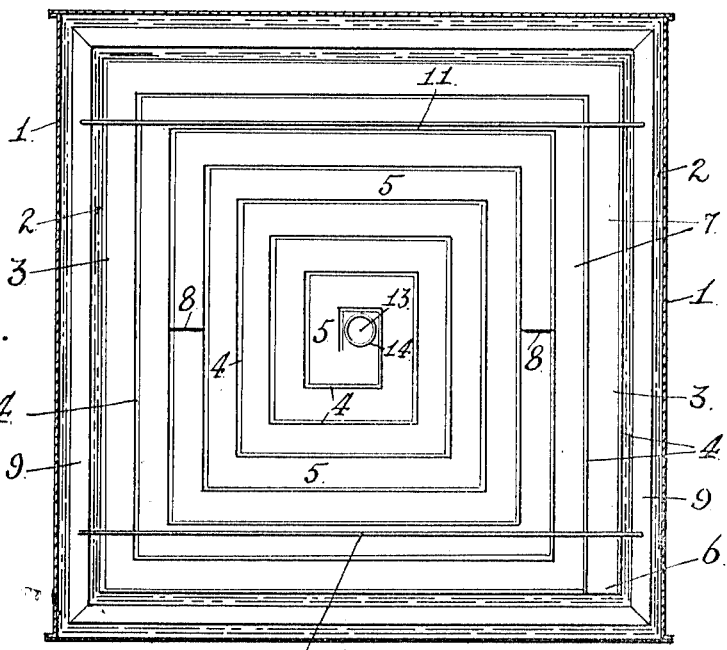

Figure 1 is a vertical section of our carbureter. Fig. 2 is a horizontal section, reduced, through the container on the line x—x of Fig. 1, looking down. Fig. 3 is a similar section on the line y—y of Fig. 1, looking up.

1 is a container in which the liquid hydrocarbon 2, in practice, gasolene, is confined. Within the container is the float 3 of material adapted for buoyancy in the gasolene body 2. Dependent from the under side of the float 3 are the partition walls 4 which, in practice, may be one or more strips of material preferably of metal. These walls are arranged in suitable manner to form between them an extensive continuous channel 5, as, for example, in the present illustration, as shown in Fig. 3, starting with the middle and thence continuing in successive outer increasing courses to one corner of the float 3 where said channel opens out at 6 into the container. A good way to attach the partition strips or walls 4 is to tack them at their outer portions to the borders of the float and to space their inner portions between strips 7 secured to the float underneath. At intervals in the channel 5, we may hang absorbent webbing 8 tacked up to the spacing strips 7.

9 is a guiding and leveling float for the float 3. It consists of a frame surrounding and slightly spaced from the float 3. Its top is provided with diagonal corner rods 10 lying above the corners of the float 3 and its bottom has cross rods 11 lying under said float 3. Fitted to the top of the container 1 at one side is the entrance pipe 12 which is to proceed from a suitable source of air, in practice, from an air compressor. From this entrance pipe 12 leads a flexible tube 13 which is connected at its inner end with a nipple 14, in the center of float 3, said nipple opening through the float into the beginning of the channel 5.

15 is the outlet pipe which delivers the carbureted air from the container to its destination, in practice, the pipe system of the light-burners.

16 is a relatively small tank connected by a nipple 17 with the bottom of the container 1, said tank having a draw-off faucet 18. Into this tank 16 is let the filling tube 19 in which we have shown a float 20 having a rod 21 which extends upward and is used as an indicator for determining the level of the gasolene body 2 in the container 1. A cap 22 normally closes the filling tube 19.

The operation of the carbureter is as follows:—Air is supplied through the connections 12 and 13. It need only be said that the volume and pressure of this air will depend upon the number of lights used, but as the compressor or device to effect this result forms no part of the carbureter proper, it need not be herein illustrated. It will be sufficient to show that the carbureter lends itself to this action or operation. The air from the tube 13 is admitted under the float 3, to the beginning of the carbureting channel 5. It thence passes over and directly in contact with the surface of the gasolene body 2, throughout the extensive course of said channel. During its passage it is carbureted, and is delivered from the end of said channel at 6 into the container 1 and fills the upper portion of said container, being drawn off through pipe 15 in volume as needed by the light-burners of the illuminating system. According to the number and needs of the light burners, air under proper pressure and in proper volume will be delivered to the carbureter; and the float 3, it will readily be seen, will rise relatively to the surface of the gasolene, to accommodate whatever volume is supplied, and said air will be uniformly and constantly held down by the float in contact with the gasolene, thus producing uniform carburation. The exposure of the upper ends of the absorbent webbings 8 to the air will increase the carburation. The tendency of the float 3 to tilt under the air pressure is corrected by the contact of the upper surface of the float corners with the corner rods 10 of the outer float 9, and the contact of the lower edges of the partition walls 4 with the cross rods 11 of said float 9, and thus the float 3 is kept level and held well in proper position. When there is no air pressure, the tendency of the float 3 to sink too low is relieved by the cross rods 11, as the walls 4 may rest upon them. The small tank 16 serves three purposes. It is used to drain off the contents of the container; also during operation of the apparatus it serves to drain off all water of condensation and such water as may be in the gasolene; and finally as a means through which to fill the container 1 with gasolene. The flexibility of the tube connection 13 is to permit the free movement of the float 3, both in its operation under the varying air-pressure, and according to the level of the gasolene in the container.

We claim:—

1. A carbureter comprising a container for the liquid hydrocarbon, said container having a delivery outlet for the carbureted air; a float supported by the hydrocarbon contents of said container; a second float surrounding but independent of the first float and having suitable stops for limiting the tilting movement of the first float; and means for delivering the air to be carbureted directly upon the surface of the hydrocarbon under the first float.

2. A carbureter comprising a container for the liquid hydrocarbon, said container having a delivery outlet for the carbureted air; a float supported by the hydrocarbon contents of said container; partition walls depending from the under side of the float arranged to form an extensive continuous carbureting channel, one end of which is open to the container interior; a second float surrounding but independent of the first float and having suitable stops for limiting the tilting movement of the first float; and means for delivering the air to be carbureted to the other end of said channel directly upon the surface of the hydrocarbon under the first float.

3. A carbureter comprising a container for the liquid hydrocarbon, said container having a delivery outlet for the carbureted air; a float supported by the hydrocarbon contents of said container; a second float surrounding but independent of the first float; rods secured to said second float lying above and below the first float, to form stops for limiting the tilting movement of said first float; and means for delivering the air to be carbureted directly upon the surface of the hydrocarbon under the first float.

4. A carbureter comprising a container for the liquid hydrocarbon, said container having a delivery outlet for the carbureted air; a float supported by the hydrocarbon contents of said container; partition walls depending from the under side of the float arranged to form an extensive continuous carbureting channel, one end of which is open to the container interior; a second float surrounding but independent of the first float; rods secured to the upper side of the second float and lying above the first float to form upper stops therefor; other rods secured to the under side of the second float and crossing under the lower edges of the partition walls of the first float to form lower stops for said first float; and means for delivering the air to be carbureted to the other end of said channel directly upon the surface of the hydrocarbon under the first float.

In testimony whereof we have signed our names to this specification in the presence of two subscribing witnesses.

STEPHEN P. SMITH.
CHARLES W. KEIVER.

Witnesses:
 WM. F. BOOTH,
 S. CONSTINE.